United States Patent [19]

White

[11] Patent Number: 5,107,271
[45] Date of Patent: Apr. 21, 1992

[54] TARGET TRACK ASSESSMENT

[75] Inventor: Arthur J. White, Hampshire, England

[73] Assignee: Siemens Plessey Electronic Systems Limited, Chessington, England

[21] Appl. No.: 129,431

[22] Filed: Nov. 13, 1987

[30] Foreign Application Priority Data

Aug. 19, 1987 [GB] United Kingdom ............... 8719191

[51] Int. Cl.⁵ ............................................. G01S 13/66
[52] U.S. Cl. ................................. 342/195; 342/189; 364/423; 364/517; 235/411; 367/97; 367/98; 367/100
[58] Field of Search .............. 364/423, 516, 517, 200, 364/900

[56] References Cited

U.S. PATENT DOCUMENTS

| | | | |
|---|---|---|---|
| 3,242,487 | 3/1966 | Hammack | 364/423 X |
| 3,996,590 | 12/1976 | Hammack | 364/516 X |
| 4,533,261 | 12/1986 | Kosaka et al. | 364/517 X |

Primary Examiner—Bernarr E. Gregory
Attorney, Agent, or Firm—Fleit, Jacobson, Cohn, Price, Holman & Stern

[57] ABSTRACT

The invention provides a method of and apparatus for determining if a newly reported target is correlatable with target tracks already stored in a data base. Correlation is effected in stages rejecting uncorrelatable stored target tracks and accepting closely correlated target tracks and includes decision applying means for accepting a stored target track as a correlated track only under stringent conditions.

6 Claims, 2 Drawing Sheets

TARGET TRACK ASSESSMENT

This invention relates to a method of multistation tracking of targets and an apparatus for the assessment of a newly reported target track and the correlation of the newly reported target track with previously reported target tracks, data relating to which is available from a store, to determine if the newly reported target track represents, in reality, a new target.

The invention is intended for use in conjunction with a plurality of target detecting and reporting stations, each of which supplies target information to a central processor which includes a data base store of target track information.

The possibility exists that a newly reported target track from one of the detecting stations has already been reported to the central processor by another detecting station and data relating thereto is stored in the data base store. It is essential that the newly reported target track is assessed against the stored target track data to see if is can be correlated with a known (already reported target) and hence can be dismissed. The implications of an error in such an assessment will be appreciated. On the other hand, if the newly reported target track can be confirmed as a known (already reported target), then data relating thereto should not be stored, as a separate target track, in the data base store to avoid overloading (and slowing down) operation of the central processor.

Known methods of correlation assessment involve the use of error distribution properties to dimension an exclusion gate (see, for example, U.S. Pat. No. 4,633,261. Any track falling outside the exclusion gate will not be correlated and will be accepted as that of a new target. However where the local track density in the observation space is high and/or where the tracking errors of a detecting station are comparatively large, one or more tracks may not be rejected and may remain as possible correlatable candidates. In this latter case, the normal procedure has been as described in U.S. Pat. No. 4,633,261 to repeat the statistical test with successive track reports in order to determine, from a series of tests which candidate track is most likely to be the true correlate.

A further available text describing correlation as above is Naval Research Laboratory Report No. 8340 of Oct. 1979 entitled "Naval Ocean-surveillance Correlation Handbook, 1978" by H. L. Wiener, W. W. William, I. R. Goodman and J. H. Kullback.

Where the decision to correlate or not is to be based on limited data and/or where a serious time constraint exists and correlation has to be determined on a single test, i.e. in a single pass, previous correlation methods would result in a large number of incorrect rejections with consequent unnecessary storing of new "new target" data in a central processor where, in fact, the "new target" data relates to an existing target.

It is an object of the present invention to provide an improved method of and apparatus for single pass correlation of target tracks.

According to the present invention, there is provided a method of correlating target tracks comprising the steps of comparing the position parameters of a new target with stored position/velocity parameters of known target tracks in 1) a coarse position filter for rejecting those tracks whose stored data permits safe correlation exclusion;

2) determining whether the new target can possibly be correlated, within the limits of target tracking error, with stored target tracks extrapolated to the reported time and position of the new target;

3) effecting a nearest neighbor selection of stored target tracks selected as candidates for correlation within the limits of target tracking error; and 4) where a plurality of candidates are within the limits of target tracking error, rejecting the nearest neighbor selection as a correlated candidate if the nearest neighbor extrapolated position differs in distance from the newly reported target, by more than half the distance of the next nearest neighbor.

The invention also provides apparatus for assessing the correlation of a new target with stored target tracks comprising a coarse filter for rejecting all stored target tracks whose position parameters enable safe rejection, a tracking error gate filter for passing only those stored target tracks whose up-dated position parameters lie within the tracking error tolerances, means for selecting, as a nearest neighbor, that passed target track, the updated position parameters of which position it closest to the new target, means for determining whether the position of the nearest passed target track, of a plurality of passed target tracks, differs from the position of the new target by less than half the distance of the position of the next nearest passed target track, and, if so, for accepting the nearest passed target track as a correlated target track. The invention will be described further, by way of example with reference to the accompanying drawing, in which:

Figure 1:
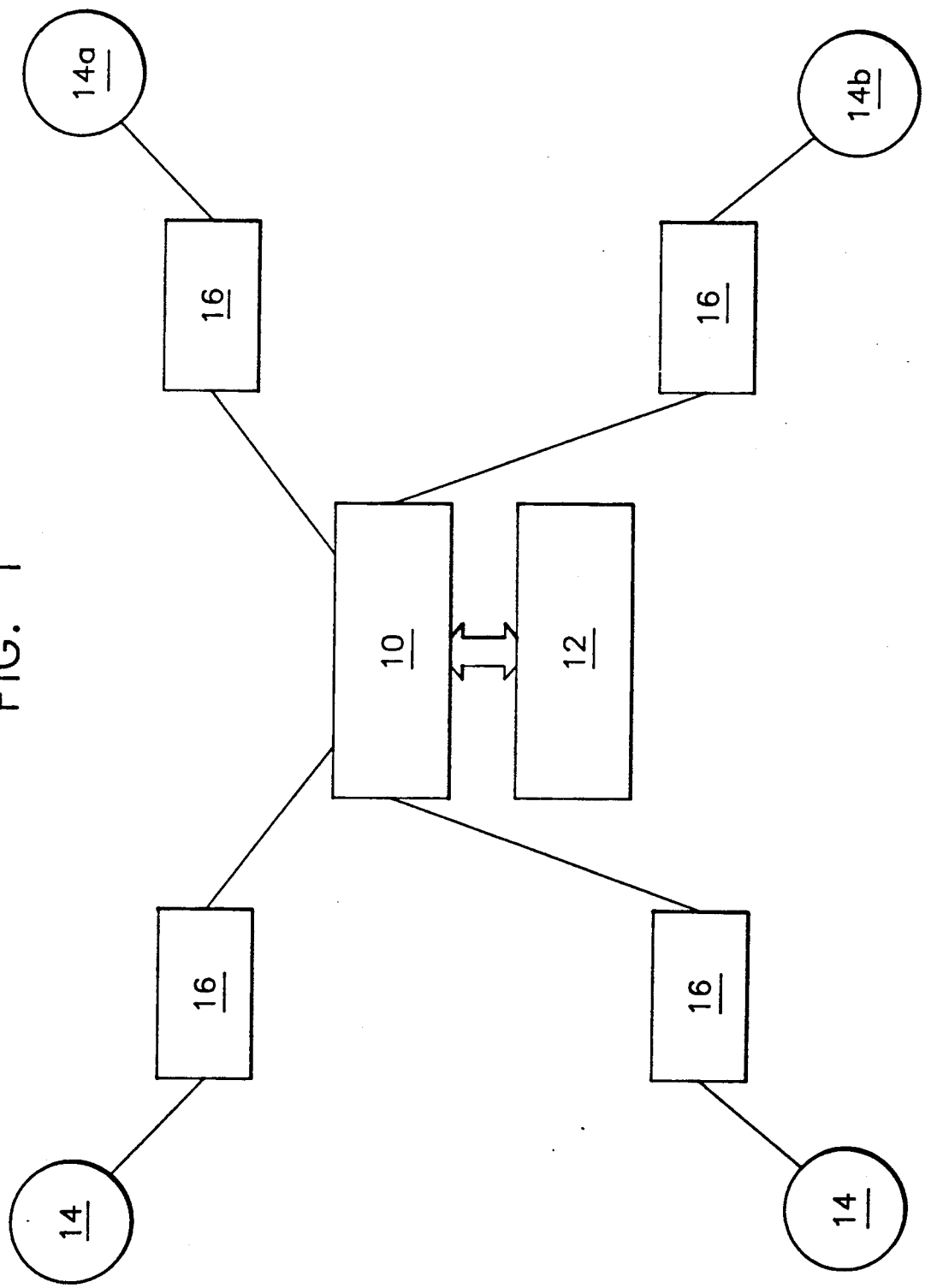
FIG. 1 is a block diagram of a tracking system incorporating pre-correlators according to the invention.

As shown in FIG. 1, a tracking system includes a central processor 10 and a data store 12. A plurality of target detecting and tracking stations 14 detect and track targets and feed information relating to the targets to the central processor 10 for information processing and for storage of time, position and velocity parameters of detected targets, in the data store 12.

Target track correlation is carried out by the central processor 10 on the information fed thereto. However, tracking station 14a may report a new target which, in fact, has already been reported by target tracking station 14b.

Figure 2:
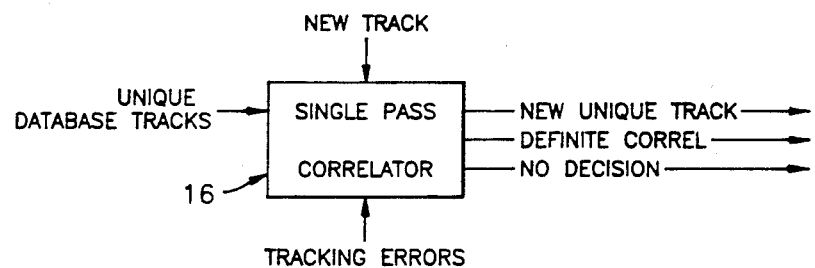
FIG. 2 is an explanatory diagram of a pre-correlator according to the present invention.
Figure 3:
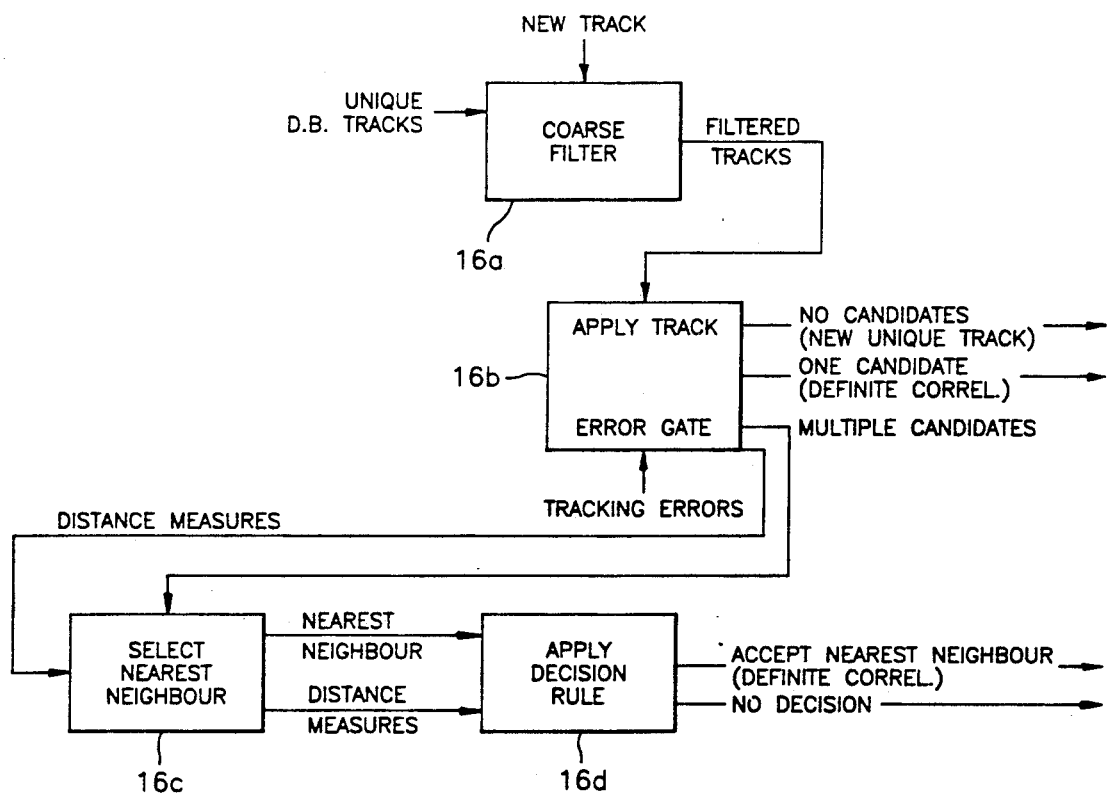
FIG. 3 represents the elements of the pre-correlator of FIG. 2.

In order to avoid overloading the central processor 10 (and hence slowing down its operation), there is provided, in accordance with the present invention between each tracking station 14 and the central processor 10, a pre-correlator 16. It will be appreciated that each pre-correlator 16 may form part of its tracking station 14 or may form part of the central processor 10. The duty of each of the pre-correlators 16 is to ensure that data, relating to a new target, is not correlatable with that of a track already held in the data store 12. The pre-correlator 16 applies an algorithm in stages, in a single pass, to a newly received target detection. FIG. 2 illustrates the functional operation of the pre-correlator whilst FIG. 3 shows this in more detail.

The pre-correlation algorithm assesses, in a single pass, whether or not a new received track is the track of a new target or is the track of a target currently being received from another station 14 and already held in the data store 2. This is done by comparing the positions parameters of the new track with up-dated position parameters of all other tracks in the data base store 12. The assessment is made in four stages by appropriate filters of the pre-correlator 16, as follows:

A coarse filter gate 16a (see FIG. 2)-this is a large rectangular position filter whose purpose is to reject, rapidly and with the mimimum of computation, all those stored data base tracks which can be safely excluded as correlation candidates.

A tracking error gate 16b—this is a smaller position filter whose size and shape is determined by the information available with regard to the tracking errors attributable to the track reporting sources 14. Data base tracks which have passed the coarse filter gate 16a have their position co-ordinates extrapolated to the time of occurrence of the new track report and it is then determined whether the extrapolated position falls within the tracking error gate centred on the position of the new track. If no data base tracks fall within the tracking error gate, then the new track is accepted as unique.

Nearest neighbor selection-this is the selection of the data base track whose extrapolated position is closest to that of the new track within the tracking error gate as being the most likely correlation candidate.

The conservative decision rule—this is applied in the box 16c to determine whether or not there is any evidence for the acceptance of the nearest neighbor selection as a valid correlation.

The coarse filter gate 16a operates in the following manner:-

Let the track position parameters of the new track be (X, Y) at time t and let the parameters of a data base track be $(X_i, Y_i, x_i, y_i)$ at time $t_i$. The data base track will pass the coarse filter gate 16a if:

$$X - X_i < \pm K_1 \text{ and } Y - Y_i < \pm K_2$$

$K_1$ and $K_2$ are constants whose values are arranged to be greater than 3 times the average tracking error of the new track reporting source 14.

The tracking error gate 16b operates in the following manner:-

For data base tracks from the store 12 passing the coarse filter gate 16a, the tracking error gate 16b determines whether or not they can be rejected as correlation candidates, with a high degree of confidence. The current information on the variance and covariance of track positional coordinates is unfortunately, normally held by the tracking filters at the reporting sources 14 and is not transmitted with track reports. The only criteria available are some track qualities, in terms of error distances and a priori estimates of the average tracking accuracy of the various reporting sources 14. For this reason a circular gate is used, with distance from the centre as a measure, discrete X and Y axi information being lost.

It is assumed that sufficient information is available to estimate $\sigma$ and $\sigma_i$, the standard deviations of track position for the new and the data base track. The following calculations are then performed.

$$\Delta t = t - t_i$$

$$X'_i = X_i + \Delta t x_i$$

$$Y'_i = Y_i + \Delta t y_i$$

$(X'_i, Y'_i)$ is the extrapolated position of the data base track. Using this position, the distance $d_i$ is calculated where:

$$d_i = ((X - X'_i)^2 + (Y - Y'_i)^2)^{\frac{1}{2}}$$

If $d_i > 3(\sigma^2 + \sigma_i^2)^{\frac{1}{2}}$ then the data base track is rejected as a correlation candidate. It should be noted that the validity of extrapolated positions depends upon the accuracy and precision of time stamping which can be attained for the stored and new track data.

Nearest neighbor selection is effected is the following manner:-

Where more that one data base track has been selected in the tracking error gate 16b as a correlation candidate for the new track, a choice must be made between candidates. A multiple pass algorithm would base candidate choice on the results of candidate selection over a number of update cycles. In a single pass, the choice must be made after a single selection. In these circumstances the most likely candidate is chosen by the nearest neighbor rule in 16d of FIG. 3. If the distances $(d_i \ldots d_n)$ are associated with n candidate tracks, then the one for which $d_i = \min(d_i \ldots d_n)$ is chosen in the box 16c as the most likely candidate for correlation; the "nearest neighbor".

The conservative decision rule is applied in the box 16d as follows:-

The nearest neighbor rule will have selected the most likely correlation candidate in 16d of FIG. 3, if the new track is, in fact, correlated with a data base track. All the steps in the algorithm so far have been rejection stages so that the most that can be said about the selected candidate is that there is no evidence that it is not correlated with the new track. The number of candidates passing the tracking error gate 16b, (where multiple candidates are present) will be small, typically 2 to 4. Their presence is due to such factors as manoeuvre, over-estimation of tracking errors and locally small target separation. The sample is too small to form a basis for strict statistical criteria, but a logical expectation rule can be derived in order to assess the validity of acceptance of the nearest neighbor candidate.

If we assume that the nearest neighbor candidate track and the new track are reporting the same target, then $\min(d_i \ldots d_n)$ is a measure of error. All other members of $(d_i \ldots d_n)$ will be a measure of error plus target separation. An elementary test, for a structure or pattern in the candidate track distances corresponding to this assumption, is as follows:

$$\min(d_1 \ldots d_n) < \sum_{i=1}^{n} d_i/(n+1)$$

$$\text{all other}(d, \ldots d_n) > \sum_{i=1}^{n} d_i/(n+1)$$

If this condition is fulfilled, the nearest neighbor candidate is accepted in 16e as correlating with the new track. Otherwise no decision is made and, at this stage, the new track is accepted as a new track for storage in the data store 12 and for processing by the central processor 10.

Where only two candidates are passed by the tracking error gate 16b and $d_2 > d_1$, then the test applied in the box 16d reduces to:

$$2d_1 < d_2$$

as a condition of acceptance of the nearest neighbor candidate.

This test is called the conservative decision rule because, in simulated testing, it was shown to be more likely to reject a true correlation than to accept a false correlation.

The invention is not confined to the precise details of the foregoing example. For instance, it will be realised that a tracking system as described is merely by way of example and may include many more detecting and tracking stations (or fewer) and will comprise more elements (not described) performing other functions. Similarly, the realisation of the coarse filter gate, the tracking error gate, the nearest neighbor selection and the application of the conservative decision rule can take a wide variety of forms as to hardware, firmware and software.

I claim:

1. A method of multistation tracking of targets and or correlating target tracks, said tracking method providing position parameters for a new target from a detection and tracking station, said correlating method including comparing said position parameters of said new target with up-dated stored position parameters of known target tracks, said correlating method comprising the steps of:
   1) rejecting, in a coarse position filter, those of said known target tracks whose up-dated position parameters when compared with said position parameters of said new target permit safe correlation exclusion;
   2) accepting, as correlation candidates, said known target tracks whose up-dated stored position parameters differ from the position parameters of said new target by no more than a known target tracking error;
   3) effecting a nearest neighbor selection of three known target tracks which have been selected as correlation candidates; and
   4) where there are a plurality of accepted correlation candidates, rejecting as one of the correlation candidates, a selected nearest neighbor whose up-dated position parameters differ from the position parameters of said new target by more than half the difference between the position parameters of a next nearest neighbor selected from the accepted correlation candidates and the position parameters of said new target.

2. A method as claimed in claim 1 including the steps of: rejecting in said coarse position filter, as candidates for correlation, all of said known target tracks whose up-dated stored position parameters differs from the position parameters of said new target by more than three times an average tracking error of said detection and tracking station.

3. A method as claimed in claim 1 including the steps of: rejecting, as candidates for correlation, those of said known target tracks whose up-dated stored position parameters differ from said position parameters of said new target by more than three times the square root of the sum of the squares of a standard deviation of the known target track and the new target track.

4. A method as claimed in claim 1 including the step of: accepting, as a correlated track, a selected nearest neighbor, from accepted correlation candidates, whose up-dated position parameters differs from the position parameters of said new target by a distance which is less than a mean of the difference between the position parameters of all other known target tracks accepted as correlation candidates and the position parameters of said new target, and all other known target tracks, accepted as correlation candidates, have differences greater than said mean.

5. A multistation detection and tracking system including a correlator for correlating position parameters of, a new target track with position properties of known target tracks stored in a database, said system including:
   1) a coarse filter for rejecting, as correlation candidates, all those stored known target tracks whose position parameters differ by more than a predetermined multiple of an average tracking error of a detecting and tracking station which reported the new target track;
   2) a tracking error gate filter for accepting, as correlation candidates, stored known target tracks, the up-dated position parameters of which differ from the position parameters of the new target by not more than a predetermined multiple of the square root of the sum of the square of standard deviations of the new target track and of the known target tracks;
   3) means for effecting a nearest neighbor selection of known target tracks, accepted as candidates for correlation; and
   4) means for accepting, as a correlated track, a nearest neighbor of a plurality of accepted known target tracks, said nearest neighbor having position parameters which differ from the position parameters of said new target track by less than half a distance between said new target track and a next nearest neighbor of said plurality of accepted known target tracks.

6. A multistation detecting and tracking system comprising a plurality of target detecting and tracking stations, a control processor to which said stations report, a data store attached to said central processor for storing data, including position parameters of known target tracks, reported by said stations, for processing by said central processor, and a correlator for correlating a new target track reported by one of said target detecting and tracking stations, with known target tracks stored in a database in said data store, said correlator comprising:
   1) a coarse filter for rejecting, as correlation candidates, all those stored known target tracks whose position parameters differ from position parameters of said new target track by more than a predetermined multiple of an average tracking error of said one of said target detecting and tracking stations,
   2) a tracking error gate filter for accepting, as correlation candidates, stored known target tracks whose up-dated position parameters differ from position parameters of a new target by not more than a predetermined multiple of the square root of the sum of the squares of standard deviations of track positions of the new and the stored target tracks;
   3) means for effecting a nearest neighbor selection of accepted stored known target tracks; and
   4) means for accepting, as a correlated track, a nearest neighbor selection of a plurality of accepted stored known target tracks, being that accepted stored known target track the position parameters of which differ from the position parameters of the new target track by less than half the difference between the position parameters of a next nearest neighbor and the new target track;
   said correlator being interposed between at least one of said stations and said central processor.

* * * * *